United States Patent [19]
Crosby et al.

[11] Patent Number: 5,801,530
[45] Date of Patent: Sep. 1, 1998

[54] PROXIMITY SENSOR HAVING A NON-FERROUS METAL SHIELD FOR ENHANCED SENSING RANGE

[75] Inventors: Robert J. Crosby, Wickliffe; Harold W. Everson, Jr., Mentor, both of Ohio

[73] Assignee: Namco Controls Corporation, Cleveland, Ohio

[21] Appl. No.: 787,887

[22] Filed: Jan. 23, 1997

Related U.S. Application Data

[63] Continuation of Ser. No. 423,160, Apr. 17, 1995, abandoned.

[51] Int. Cl.⁶ .................................................. G01B 7/14
[52] U.S. Cl. ........................... 324/207.26; 324/207.16; 324/236; 336/84 R; 174/36
[58] Field of Search .................. 324/207.26, 207.22, 324/222, 228, 229, 230, 234–241, 207.15, 207.16; 331/65; 336/84 C, 84 R, 84 M, 221; 307/116; 174/35 R, 36

[56] References Cited

U.S. PATENT DOCUMENTS

| | | | |
|---|---|---|---|
| 2,628,342 | 2/1953 | Taylor | 336/84 R |
| 2,724,108 | 11/1955 | Hayes et al. | 336/84 R |
| 2,933,677 | 4/1960 | Lieber | 324/230 |
| 3,634,799 | 1/1972 | Strauch | 324/207.16 |
| 3,973,191 | 8/1976 | Zabler | 331/65 |
| 3,996,510 | 12/1976 | Guichard | 336/84 R |
| 4,268,771 | 5/1981 | Lace | 324/207.26 |
| 4,384,252 | 5/1983 | Kolter | 324/239 |
| 4,408,159 | 10/1983 | Prox | 324/207.12 |
| 4,433,309 | 2/1984 | Hermle et al. | 331/65 |
| 4,513,257 | 4/1985 | Miyamoto et al. | 331/65 |
| 4,553,040 | 11/1985 | Truper et al. | 307/116 |
| 4,571,501 | 2/1986 | Crosby | 327/484 |
| 4,618,823 | 10/1986 | Dahlheimer et al. | 324/207.16 |
| 4,638,262 | 1/1987 | Miyamoto | 331/65 |
| 4,644,298 | 2/1987 | Kamiya et al. | 331/65 |
| 4,866,383 | 9/1989 | Taliaferro | 324/228 |
| 4,879,512 | 11/1989 | Leonard et al. | 324/207.16 |
| 4,879,531 | 11/1989 | Tigges et al. | 331/65 |
| 4,893,076 | 1/1990 | Leonard et al. | 324/207.17 |
| 4,914,388 | 4/1990 | Kalista et al. | 324/207.16 |
| 4,983,914 | 1/1991 | Baranski | 324/207.16 |
| 5,012,206 | 4/1991 | Tigges | 331/65 |
| 5,034,690 | 7/1991 | Taliaferro | 324/228 |
| 5,034,704 | 7/1991 | Tomioka et al. | 331/65 |
| 5,043,679 | 8/1991 | Kriz et al. | 331/65 |
| 5,239,204 | 8/1993 | Mueller et al. | 307/116 |
| 5,264,733 | 11/1993 | Tigges | 324/207.16 |
| 5,285,154 | 2/1994 | Burreson | 324/207.16 |
| 5,302,894 | 4/1994 | Hrubes | 324/207.16 |
| 5,336,997 | 8/1994 | Anim-Appiah et al. | 324/207.16 |

OTHER PUBLICATIONS

Pepperl+Fuchs, Inc. catalog showing surface mounted proximity sensor, Model Nos. NJ40–FP–A2–B1–P4 and NJ40–FP–W–B1–P4, 3 pages, copyright 1992.

Turck, Inc. catalog showing inductive sensor, Model Nos. NJ40–CP80–FZ3X, 3 pages, copyright 1994.

*Namco®Electronic Sensors General Catalog 1994: Presence & Position Sensing*, Namco Controls Corporation, Mentor, Ohio, pp. 56–61, 72–81, 86–87 (1993).

*Primary Examiner*—Jay M. Patidar
*Attorney, Agent, or Firm*—Watts, Hoffmann, Fisher & Heinke, Co., L.P.A.

[57] ABSTRACT

A proximity sensor includes a transducer and a circuit having a switch that changes state in response to a presence of an object in spaced relation to the transducer. The transducer includes a magnetic form defining a generally planar surface facing a sensing zone of the sensor. The magnetic form includes a side surface that extends away from the sensing zone and an internal cavity that opens outwardly toward the sensing zone. A sensing coil is positioned within the magnetic form cavity. The transducer additionally includes a sensor housing supporting the sensing coil and the magnetic form in relation to the sensing zone. A non-ferrous metal shield is positioned inside the sensor housing to surround at least a portion of the magnetic form and enhance a sensing range of the proximity sensor. The shield has an edge that faces the sensing zone located substantially co-incident with the generally planar surface of the magnetic form.

25 Claims, 5 Drawing Sheets

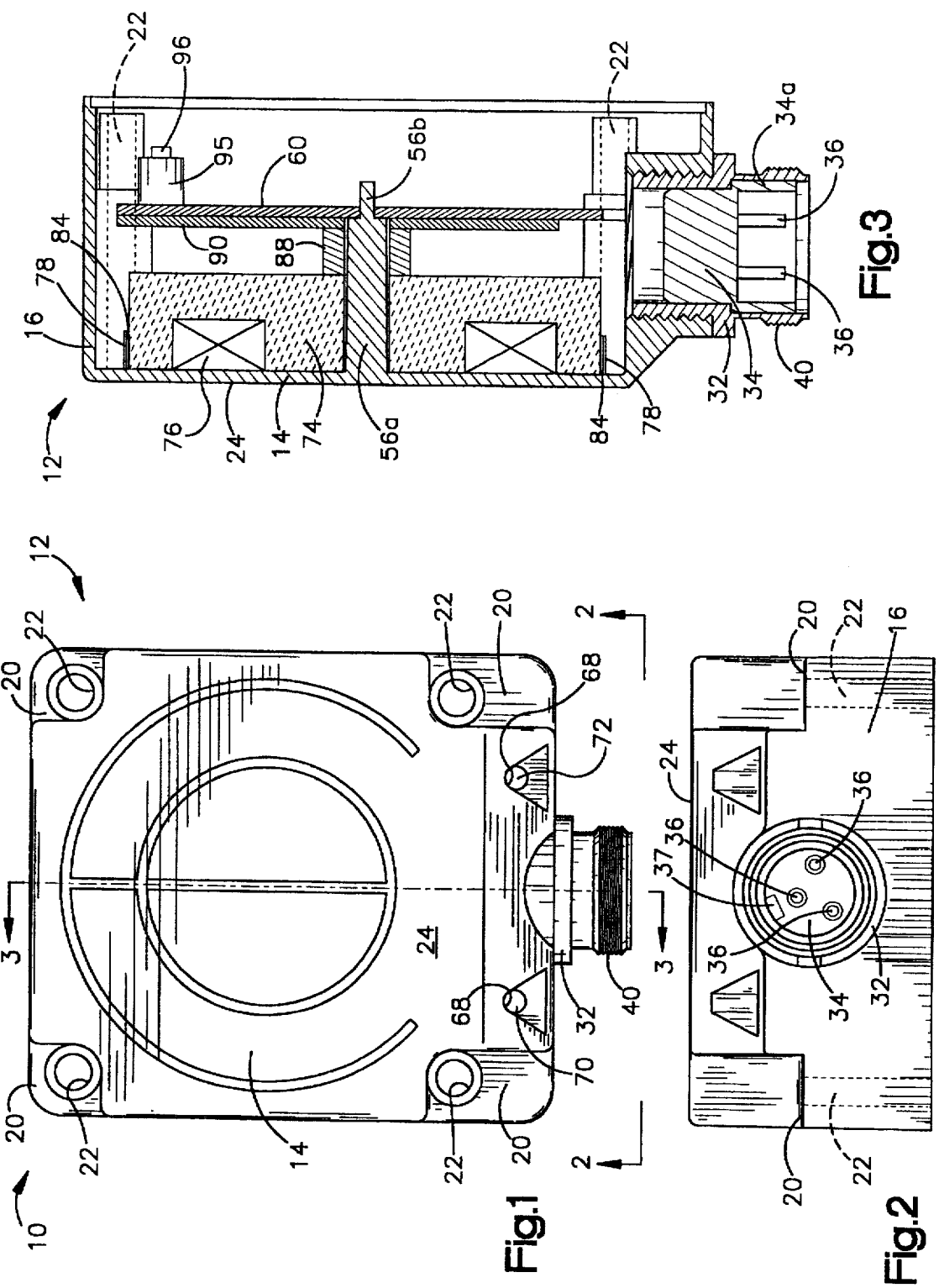

PROXIMITY SENSOR HAVING A NON-FERROUS METAL SHIELD FOR ENHANCED SENSING RANGE

This application is a continuation of application Ser. No. 08/423,160, filed Apr. 17, 1995, now abandoned.

FIELD OF THE INVENTION

The present invention concerns an improved proximity sensor and, more particularly, a proximity sensor having an increased sensing range and capable of sensing both ferrous and non-ferrous target objects.

BACKGROUND ART

U.S. Pat. No. 4,553,040 to Truper et al. discloses an inductive proximity switch having a transducer that includes a first conductive coil, commonly called a feeler coil. The feeler coil is a component of an LC oscillator circuit. The coil is positioned within a cup core having an open end that faces a direction in which the transducer is sensitive to a presence of a target.

A second coil, which is part of a closed circuit loop, is positioned radially outwardly from the open front end of the cup core and protrudes at least partially beyond the cup core's front surface. The closed circuit loop includes both inductive and ohmic resistance. In one embodiment, the circuit loop includes both the second coil and a series coupled resistor. In another embodiment, the circuit loop omits the series resistor and the second coil comprises a coil with single winding, that is, a metal ring or ring of foil. The ring or foil is preferably comprised of a ferrous material have both ohmic and reactive resistances.

The feeler coil is energized with an AC signal to produce a directionally oriented, alternating magnetic field. An inductive coupling between the feeler coil and the second coil results.

In one mode of operation, the proximity switch is used to detect the presence of non-magnetic metal or non-ferrous target objects, e.g., aluminum, copper, brass, etc. When the target object approaches the feeler coil, the magnetic coupling between the feeler coil and the second coil is reduced. In this mode of operation, the LC oscillator circuit is normally damped, that is, it does not oscillate. When the non-ferrous target object moves within an effective range of the proximity switch, the magnetic coupling is reduced to a point at which the oscillation circuit begins oscillating.

In a second mode of operation, the proximity switch is used to detect the presence of magnetizable metallic or ferrous target objects, e.g., iron. In this mode of operation, the closed loop circuit is disabled by opening a switch in the circuit. With the closed loop circuit open-circuited, the oscillator normally oscillates. The magnetic field of the feeler coil is reduced as a ferrous target object approaches the feeler coil thereby damping the oscillator. When the target object moves within an effective range of the proximity switch, the oscillation circuit ceases oscillating.

By periodically opening and closing the switch in the circuit loop, the proximity switch disclosed in the Truper et al. patent purportedly functions as a detector of both ferrous and non-ferrous target objects.

Pepperl & Fuchs, Inc. of Twinsburg, Ohio offer two models of surface mounted type proximity sensors which are purported to have a 40 mm sensing range. Model No. NJ40-FP-A2-B1-P4 is a four wire self-contained unit that provides a DC output. Model No. NJ40-FP-A2-B1-P4 is a two wire self-contained unit that provides an AC output. A housing in these sensors purportedly include a metal and a "crastin" portion.

A continuing goal of designers of proximity sensors is to increase the sensitivity of the such sensors, that is, increase the effective range of the sensor in detecting approaching target objects. Another goal of designers of proximity sensors is to design a proximity switch sensitive to both ferrous and non-ferrous target objects.

DISCLOSURE OF THE INVENTION

A novel proximity sensor is disclosed that can detect both ferrous and non-ferrous target objects. The proximity sensor of the present invention includes a transducer and switch coupled to the transducer. The switch changes state when the transducer senses a target object in a sensing zone.

The transducer includes a magnetic form defining a generally planar surface facing the sensing zone, a side surface that extends away from the sensing zone, and an internal cavity that opens outwardly toward the sensing zone. The transducer further includes a sensing coil positioned within the internal cavity of the magnetic form.

A sensor housing is provided to support the magnetic form in relation to the sensing zone. The transducer additionally includes a non-ferrous metal shield positioned inside the sensor housing surrounding at least a portion of the magnetic form. The shield includes an edge facing the sensing zone which is co-planar with the planar surface of the magnetic form.

Preferably, the side surface of the magnetic form has a generally cylindrical shape and the metal shield preferably comprises a non-ferrous metal strip that encircles the cylindrical shaped side surface. The strip is spaced apart from the side surface by a strip of insulating material which is adhesively attached to one surface of the strip.

Oftentimes, the sensor will be used to sense objects moving across the surface of a workstation or workplace which consists of a generally flat metal plate. In such an application, the sensor will be inserted into a cutout portion of metal plate such that an upper sensing surface of the sensor is flush with an upper surface of the plate. Under these conditions, it has been found that the sensing range for conventional sensors is decreased because of the effect of the surrounding metal plate.

In the proximity sensor of the present invention, the non-ferrous metal strip positioned as set forth above has been found to shield the sensor from the deleterious effects of the surrounding metal plate. Thus, the proximity sensor of the present invention has an increased effective sensing range when positioned in a metal plate as compared to a conventional sensor. Of course, it should be understood that the sensor of the present invention may be used in any environment, metal or nonmetal.

These and other objects, advantages and features of the invention will become better understood from a detailed description of a preferred embodiment of the invention which is described in conjunction with the accompanying drawings.

BRIEF DESCRIPTION OF THE DRAWINGS

FIG. 1 is a front elevation view of a proximity sensor constructed in accordance with the present invention;

FIG. 2 is a bottom plan view of the proximity sensor shown in FIG. 1;

FIG. 3 is a sectional view of the proximity sensor shown in FIG. 1 as seen from a plane indicated by 3—3 in FIG. 1;

DETAILED DESCRIPTION

Figure 4:
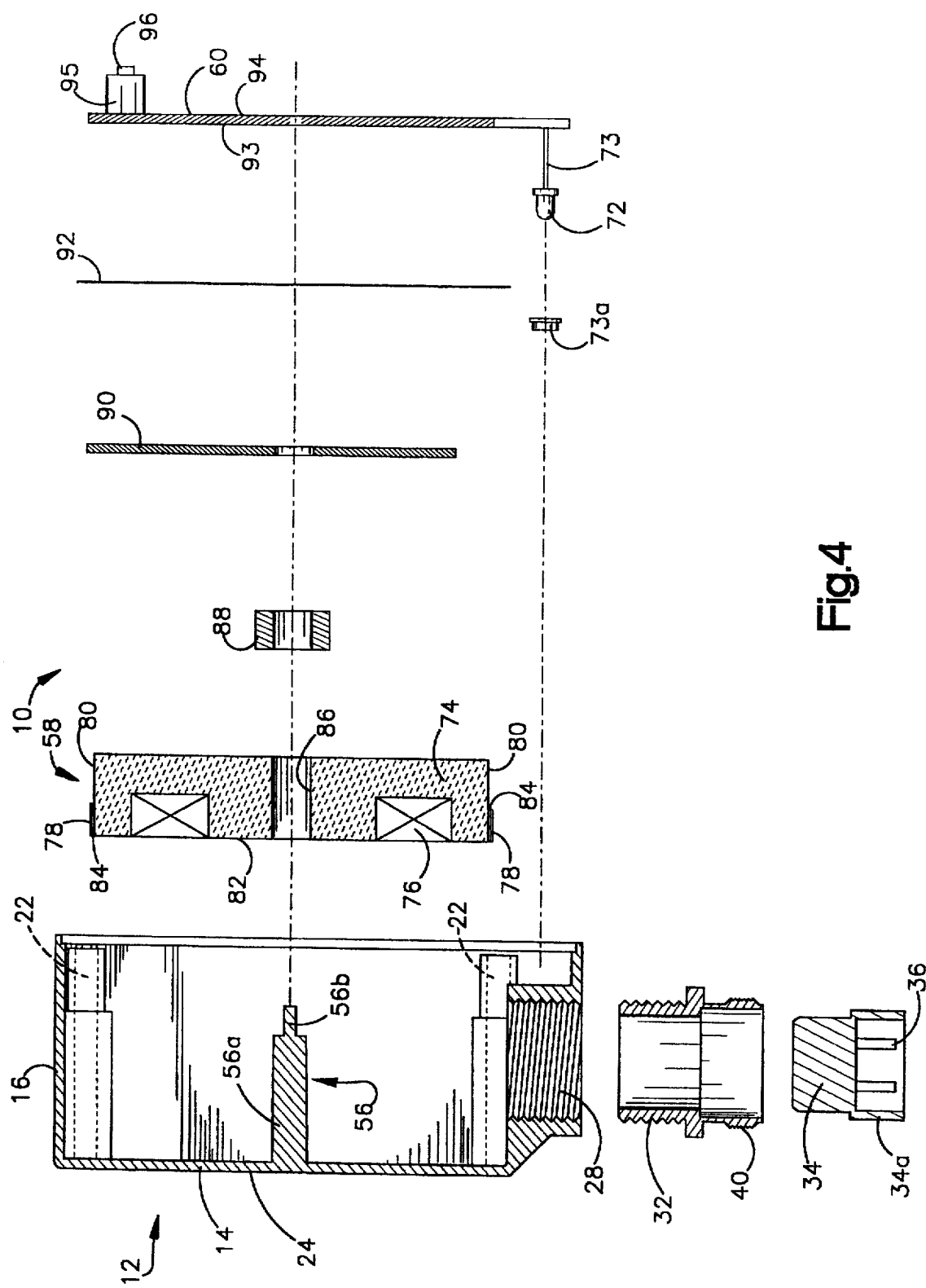
FIG. 4 is an exploded sectional view of the proximity sensor of FIG. 1.

Turning now to the drawings, FIGS. 1–4 show a proximity sensor of the present invention generally at 10. The sensor 10 includes a durable plastic housing 12 having target facing wall 14 and four side walls 16 extending from the target facing wall. The walls 14, 16 define a hollow interior region in the housing 12. As shown diagrammatically in FIG. 5, a sensing region or zone SR of the proximity sensor 10 extends from the target facing wall 14. The sensing zone SR has a generally domed shape. The sensing zone SR extends above the target facing wall 14. The sensor 10 has an effective sensing range of approximately 40–50 mm, which is represented by Z in FIG. 5. In a horizontal direction, adjacent the target facing wall 14, the sensor 10 has an effective range diameter of approximately 60–62 mm, which is represented by W in FIG. 5.

Figure 5:
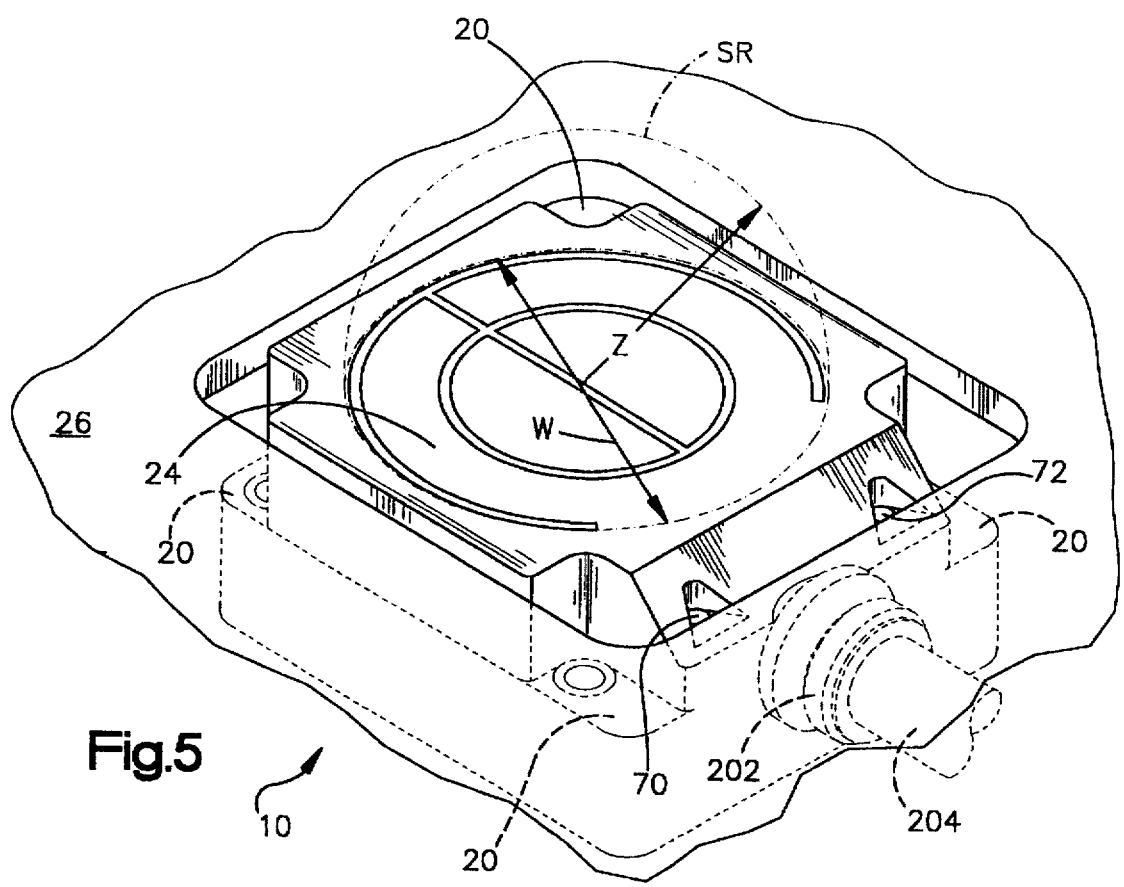
FIG. 5 is a perspective view of the proximity sensor shown in FIG. 1 as installed for use.

The housing 12 includes four recessed corner portions 20 having apertures 22. The apertures 22 permit the proximity sensor 10 to be mounted to a support member (not shown) via bolts or screws (not shown) extending through the apertures. As can be seen in FIG. 5, the proximity sensor 10 may be secured in a recessed cavity such that an outside surface 24 of the end wall 14 is substantially flush with a metal workplace surface 26.

The proximity sensor 10 detects target objects (a target object is shown diagrammatically in FIGS. 6 and 7) moving across the workplace surface 26 that travel within an effective range of the proximity sensor sensing zone. The proximity sensor 10 detects both ferrous and non-ferrous target objects. As will be explained below, detection of a target object will cause a change in state of an output coupled to a load, e.g., to energize a device, turn on a switch, transmit a signal, etc.

The housing 12 includes an internally threaded opening 28 (FIG. 4) for supplying power to sensor electronics 30 (shown diagrammatically in FIGS. 6 and 7) physically located on a printed circuit board 60 disposed in the housing interior region. A receptacle shell 32 threads into the threaded opening 28. A terminal accepting insert 34 is pressed into the receptacle shell 32 and secured with a suitable adhesive such as LOCKTITE. The insert 34 includes three outwardly extending terminals 36 (two of which can be seen in FIGS. 3 and 4) which fit into corresponding openings in a connecting end 202 of a coaxial cable 204 (shown in phantom in FIG. 5). A nub 37 extending inwardly from a wall 34a surrounding the terminals 36 insures that the coaxial cable connecting end is properly aligned with the terminals.

Inner ends of the terminals 36 in the terminal accepting insert 34 are electrically coupled via wires (not shown) to power and output interface circuitry 38 (shown diagrammatically in FIGS. 6 and 7) which is part of the sensor electronics 30. An internally threaded end connection (not shown) of the coaxial cable is threaded onto an externally threaded bottom portion 40 of the receptacle shell to secure the cable to the housing 12.

Figure 6:
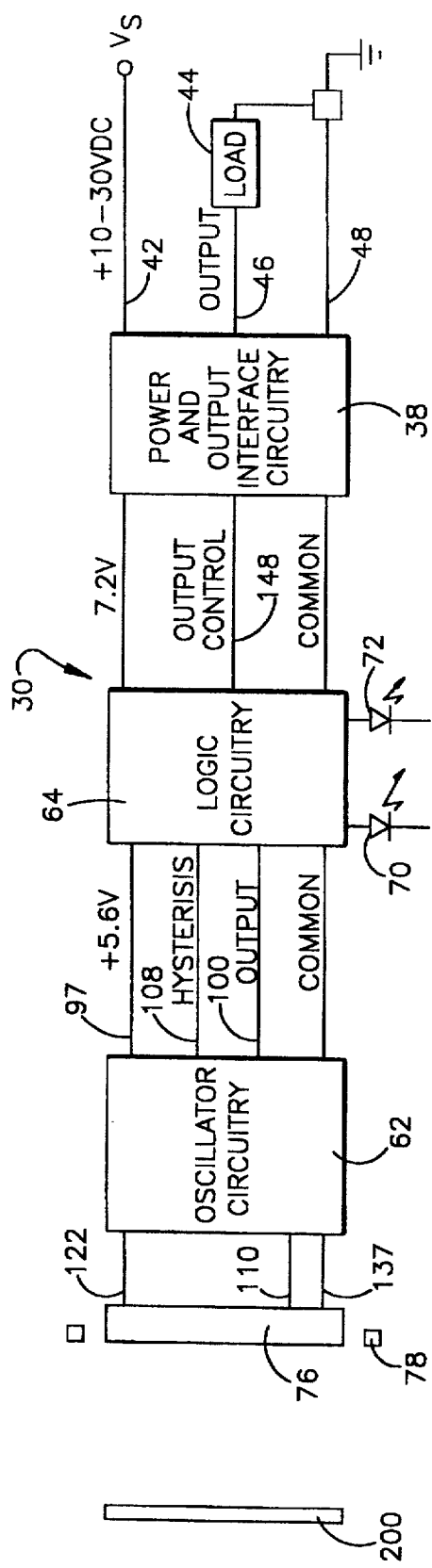
FIG. 6 is a diagrammatic block diagram of the proximity sensor of FIG. 1 having a three wire power input.
Figure 7:
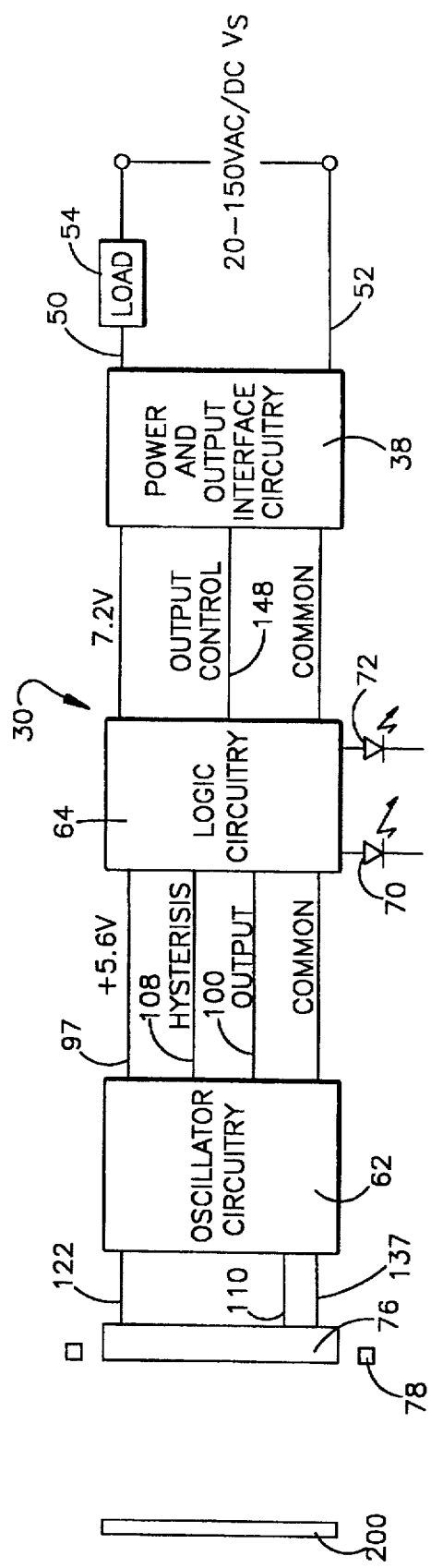
FIG. 7 is a diagrammatic block diagram of the proximity sensor of FIG. 1 having a two wire power input, the input being AC or DC.

FIGS. 6 and 7 illustrate two different sources of power coupled to the power and output interface circuitry 38. FIG. 6 shows a source of DC power Vs in a range of 10 to 30 volts supplied to the power and output interface circuity 38 via an input connection 42. A state of energization of a load 44 coupled to an output connection 46 is changed when the proximity sensor 10 detects a target object 200. The load 44 may be any of a number of electrical or electromechanical devices, solenoids and counters are typical devices. A third connection 48 functions as a common or ground connection.

In FIG. 7, a two wire connection is used to supply power to the proximity sensor 10. A 20–150 volt AC or a 20–150 volt DC potential Vs is applied across the connections 50, 52 to supply power to the power and output interface circuitry 38. A load 54 is coupled to one of the connections 50, 52.

Figure 8:
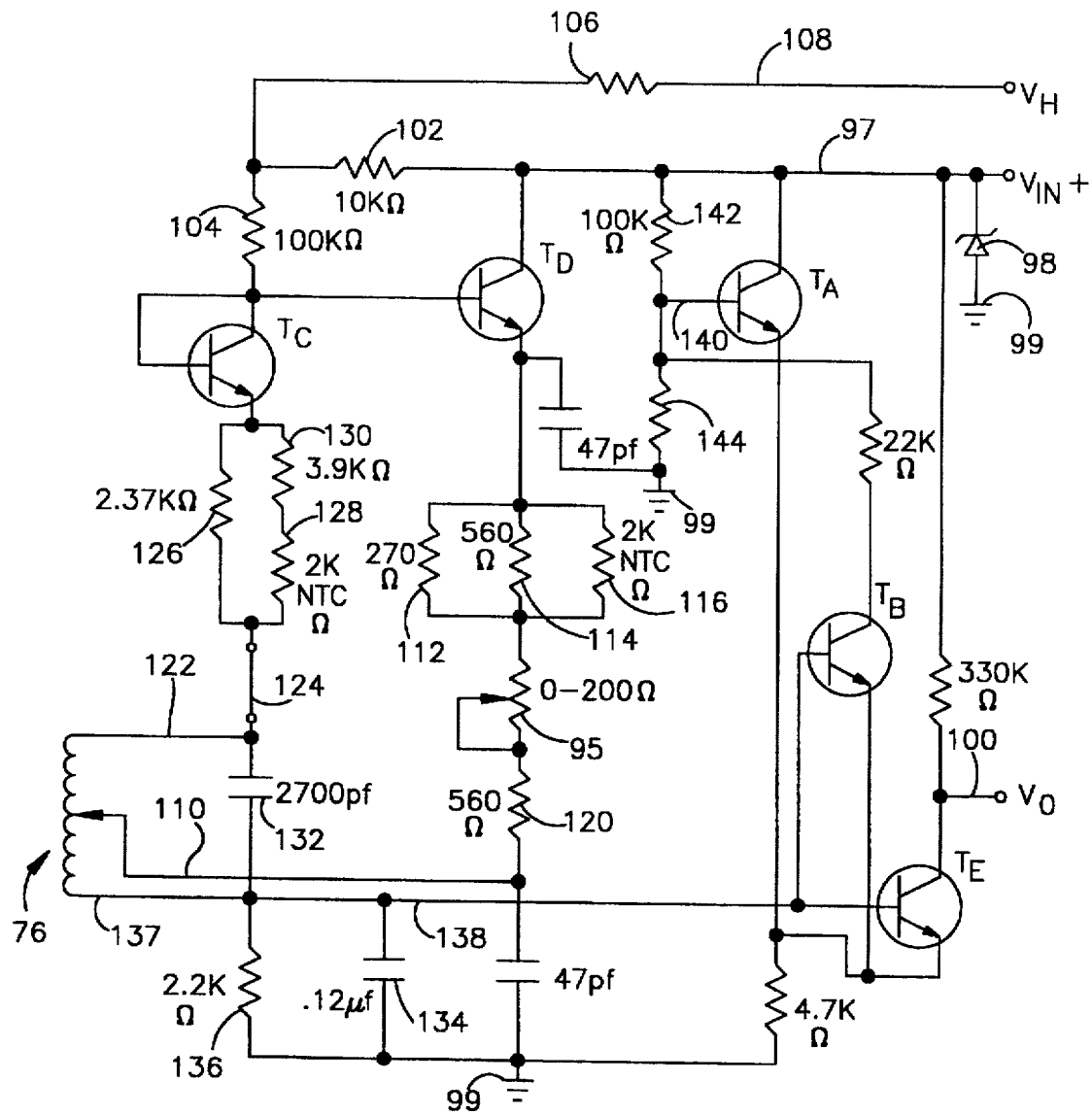
FIG. 8 is a circuit diagram of an LC oscillation circuit embodied in the proximity sensor of FIG. 1.

A stepped post 56 extends from a center of the target facing wall 14 into the housing interior. The post includes first and second portions 56a, 56b. The first portion 56a of the projection 56 is "x" shaped in cross section, while the second portion 56b is cylindrical. The post 56 supports a coil sensing assembly 58 and the printed circuit board 60 to which the sensor electronics 30 are affixed. The sensor electronics include the power and output interface circuitry 38, oscillator circuitry 62 (shown diagrammatically in FIGS. 6 and 7, a circuit diagram of the circuitry is shown in FIG. 8) and logic circuitry 64 (shown diagrammatically in FIGS. 6 and 7). Visible through two apertures 68 in the housing are two light emitting diodes 70, 72 driven by the logic circuitry 64. When the proximity sensor 10 is operational, the diode 70 is forward biased by the logic circuitry 64 to provide a visual indication of the operational condition of the sensor. When the target object 200 is detected by the proximity sensor 10, the diode 72 is forward biased by the logic circuitry 64 to provide a visual indication of the detection of the target object. The diodes 70, 72 extend from leads 73 (FIG. 4) which are soldered to the printed circuit board 60. A pair of grommets 73a center the diodes 70, 72 with the apertures 68.

As can best be seen in FIGS. 3 and 4, the coil sensing assembly 58 is comprised of a cylindrical shaped magnetically permeable pot core 74, a three terminal sensing coil 76 and a non-ferrous metal strip 78 which encircles a side wall 80 of the pot core 74. The sensing coil 76 is disposed in an annular groove in an upper surface 82 of the pot core 74. The upper surface 82 of the pot core 74 is substantially planar and when installed is substantially parallel to the target facing wall 14 of the housing 12. The pot core 74 includes a cutout portion (not shown) extending inwardly from the side wall 80 of the pot core to facilitate the connection of the ends of wires (not shown) comprising the sensing coil 76 to be connected to the printed circuit board 60. The wires are routed through the cutout portion of the pot core 74 to the printed circuit board 60.

The non-ferrous metal strip 78 is comprised of copper approximately 0.002 to 0.005 inches thick and having a width of 0.250 to 0.300 inches, which is approximately one half the height of the pot core side wall 80. An end of the strip 78 is welded to an opposite end of the strip to form a ring which encircles the pot core side wall 80. An upper edge of the strip 78 is flush with the upper surface 82 of the pot core 74. Instead of a metal strip 78, a thin non-ferrous metal ring may also be used. The circular strip 78 is spaced radially outwardly of the side wall 80 of the pot core 74 by an insulator 84. The preferred insulator 84 comprises a paper or cardboard strip approximately 0.03 to 0.05 inches thick and which includes adhesive on both a front and a back side. The adhesive attaches the strip 78 to the insulator 84 and, in turn, the insulator to the pot core side wall 80. The non-ferrous strip 78 has been found to minimize the effect of the surrounding metal plate of the work place of FIG. 5.

Figure 9:
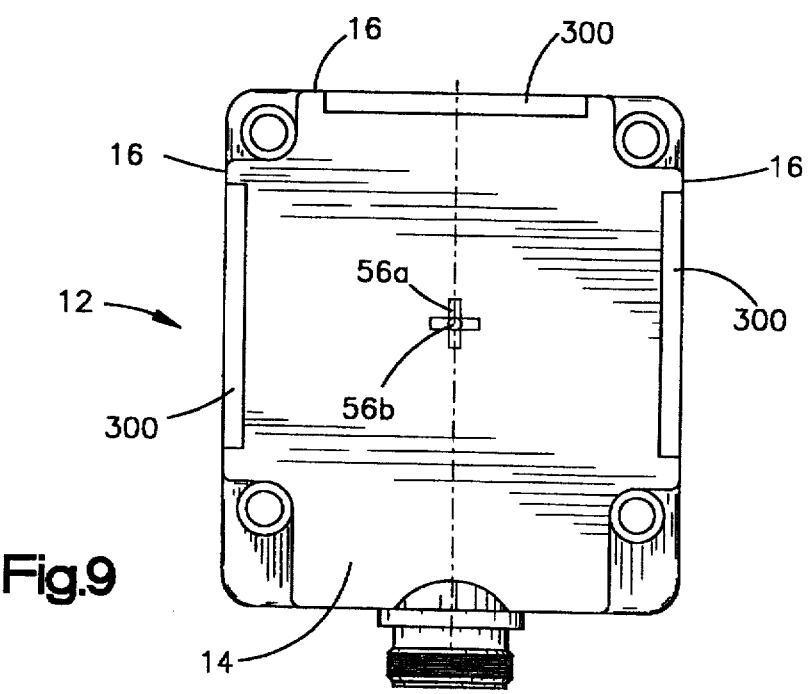
FIG. 9 is a back elevation view of a housing of an alternate embodiment of the present invention wherein shielding strips are secured to the side walls of the housing.

In an alternate embodiment of the present invention shown in FIG. 9, additional shielding from the effects of the surrounding metal plate is provided. In this embodiment, the housing 12 includes three plates 300 which are attached to inner surfaces of three of the side walls 16. The plates 300 are preferably copper coated but it should be understood that the plates may be made of various ferrous or non-ferrous materials and are not necessarily copper coated. Additionally, a ring or ring segment may be used in lieu of three discreet plates.

The pot core 74 includes a central aperture 86 sized to permit the pot core to be slid over the first portion 56a of the post 56. An insulated spacer 88 and shield plate 90 also fit over the first portion 56a of the post 56 to maintain the pot core 74 in a spaced apart relationship from the printed circuit board 60. The insulated spacer 88 is adhesively attached to the shield plate 90 and is approximately 0.250 inches in axial length. Outer surfaces of the shield plate 90 are coated with copper to shield the sensor electronics 30 disposed on a front surface of the circuit board 60 from a magnetic field set up by the sensing coil 76 when the sensing coil 76 is energized.

An outer peripheral section (not shown) of the shield plate 90 is cut out. The cut out section of the shield plate is aligned with the cut out portion of the pot core 74 to provide a more direct pathway for the sensing coil wires extending between the sensing coil 76 and the printed circuit board 60. A mylar disk 92 is sandwiched between the shield plate 90 and a back surface 93 of the printed circuit board 60 to insulate solder connections on the circuit board back surface from contacting the copper coating on shield plate 90.

The printed circuit board 60 includes a central aperture sized to slidably fit over the second, cylindrical portion 56b of the post 56. A distal end of the cylindrical portion 56b of the post 56 is flatten by an application of heat to secure the components mounted on the post in place. Alternately, a push nut (not shown) may be slid over the portion 56b of the post 56 to bear against the circuit board 60 and maintain the pot core 74, the insulated spacer 88, the shield plate 90, the insulating disk 92 and the circuit board in a fixed position with respect to the post 56.

The sensor electronics 30 includes a potentiometer 95 for adjusting the range of the proximity sensor 10 by adjusting a resistance of the potentiometer. Potentiometer resistance is adjusted by turning a rotatable knob 96 extending from the potentiometer. Potting compound (not shown) is used as filler within the housing interior region. The potting compound aids in spreading and dissipating thermal energy generated by electronic components during operation of the sensor 10.

Turning to FIG. 8, the oscillator circuitry 62 is illustrated. In essence, the oscillator circuitry 62 comprises, in conjunction with the sensing coil 76, an LC oscillator which oscillates at a predetermined frequency when powered by an output from the logic circuitry 64. The oscillator circuitry 62 is electrically coupled to the sensing coil 76 and energizes the coil. The oscillator circuitry 62 takes a signal off the sensing coil 76, converts it to a DC signal and compares it to a reference voltage.

Under normal conditions (no target object 200 in the sensing zone), the DC converted output signal from the sensing coil 76 exceeds the reference voltage and the output of the oscillator circuitry is a logic low. When the target object 200 moves into the sensing zone, the DC converted signal taken off the sensing coil is lowered below the reference voltage and the output of the oscillator circuitry is a logic high. The decrease in the DC converted signal is due to the target object 200 dampening the oscillator by eddy current loss.

A logic high output (detection of target object) from the oscillator circuitry 62 causes the logic circuitry 64 to output a high signal to the power and output interface circuitry 38. A high signal to the power and output interface circuitry causes activation or energization of a load.

When the sensor 10 is used in an environment where it is supported in a metal plate of a work place (FIG. 5), it has been found that the presence of the non-ferrous metal strip 78 encircling the side surface 80 of the pot core 74 and co-incident with the upper surface 82 of the core provides a shielding effect with respect to the surrounding metal and results in a larger effective size of the sensor sensing zone SR as compared to a sensor lacking the strip 78.

At lead 97, a regulated 5.6 volt positive DC signal is supplied to the oscillator circuitry 62 from the logic circuitry 64. The V+ potential is maintained at the desired voltage by a zener diode 98 coupled between the lead 97 and ground 99. At Vo, an output of the oscillator circuitry 62 is coupled to the logic circuitry via lead 100. A hysteresis feedback signal represented by Vh is also coupled to the oscillator circuitry.

The oscillator circuitry includes five transistors TA, TB, TC, TD, TE which are physically embodied in a single integrated circuit device, preferably, the Motorola MC3346. Current is supplied to a base of transistor TD through a 10k ohm resistor 102 and a 100k ohm resistor 104, which are coupled in series. Base terminal drives to transistor TD is also modified by logic circuitry 64 through a hysteresis feedback control loop signal designated as Vh. Vh is coupled through a 820k ohm resistor 106 via lead 108 to the base terminal of transistor TD. The resistor 106 reduces the hysteresis control signal at a given proximity sensor sensing range.

The transistor TD drives a tap terminal 110 of the sensing coil 76 through a parallel resistor combination comprising a 270 ohm resistor 112, a 560 ohm resistor 114 and a 2k ohm NTC resistor 116. The parallel resistor combination is series coupled with the potentiometer 95 (200 ohm) (also shown in FIGS. 3 and 4) and a 560 ohm resistor 120.

Feedback to the base terminal of TD is taken from a long wire terminal 122 of the sensing coil 76. The feedback signal passes through a zero ohm jumper 124 (0 ohm jumper) which is in series with a resistor network comprising a 2.37k ohm resistor 126 in parallel with series coupled resistors 128 (2k ohm NTC) and 130 (3.9k ohm). The feedback signal passes through the transistor TC, which is configured as a diode. Transistor TC compensates the base emitter junction of TD for temperature changes.

A frequency of oscillation of the oscillator circuitry 62 is set by the inductance of the sensing coil 76 (typically 180–300 micro Henry) and a 2700 pf capacitor 132. The parallel/series combination of the resistors 126, 128, 130 are the primary control over setting the hysteresis.

A 0.12 uf capacitor 134 in parallel with a 2.2k ohm resistor 136 convert the amplitude of oscillations at a short wire terminal 137 of the sensing coil 76, to a DC level at a lead 138 which is coupled to a differential comparator comprising the transistors TE, TA and TB. The voltage level at the lead 138 is compared to the reference voltage level at a lead 140. The reference voltage is set at approximately 1 volt by a voltage divider comprising a series combination of a 100k ohm resistor 142 and a 22k ohm resistor 144. If the voltage level at the lead 138 is higher than the voltage at the lead 140, the output of the transistor TE is low. If the voltage level at the lead 138 is lower than the voltage at the lead 140, the output of the transistor TE is high.

An output taken off a collector terminal of the transistor TE is coupled through lead 100 to the logic circuitry 64. An output signal of the logic circuitry 64 coupled to the power and output interface circuitry 38 via a connector 148 (FIGS. 6 and 7) is dependent on the output taken off the transistor TE collector terminal. Additionally, the logic circuitry 64 supplies a feedback control signal to the oscillator circuitry 62 which reduces hysteresis effects that would cause the output signal of the oscillator circuit at the lead 100 to flip-flop back and forth between high and low logic states when the target object 200 remains at the outer reaches or edge of the proximity sensor sensing range.

The range of the sensing zone is set by adjustment of the potentiometer 95. The range is set while the oscillator circuitry 62 is oscillating. Thermal compensation over operating temperature range is provided by the parallel resistor combination comprising resistors 112, 114, 116. The NTC resistor 116 provides thermal compensation for range. The lower the voltage (referenced to circuit common) for the hysteresis feedback signal Vh at lead 108 from the logic circuitry 64, the smaller the hysteresis in the oscillator circuitry 62.

The hysteresis feedback voltage Vh is typically high or low depending on the logic state of the oscillator circuit output signal Vo at lead 100. If the target object 200 is detected, the hysteresis feedback voltage Vh is set high. If no target object is detected, the hysteresis feedback voltage is set low.

The presence of the non-ferrous metal strip 78 encircling the side wall 80 of the pot core 74 and being flush with the upper surface 82 of the pot core biases the sensing coil 76 by absorbing some of the induced energy in the coil but not enough for the oscillator circuitry 62 to change output states signifying detection of the target object 200. That is, the presence of the strip 78 damps a magnitude of the oscillator signal at lead 138, but the damping is not sufficient to drive the signal at 138 below the reference voltage signal at lead 140.

When a metallic target, ferrous or nonferrous, approaches the sensing coil 76, the oscillator signal at lead 137 is further damped reducing the signal below the reference voltage signal at 140 and the oscillator circuitry output signal Vo at the lead 100 changes states. When the target object 200 is detected, the logic circuitry 64 changes the state of the hysteresis feedback control voltage Vh from low to high to minimize hysteresis induced changes in the output signal Vo if the target object 200 remains at the edge of the proximity sensor sensing zone.

Although the invention has been described in detail, it should be understood that those skilled in the art can make various changes, alterations and substitutions to the embodiments described herein without departing from the spirit or scope of the invention which is solely defined by the following claims.

We claim:

1. A proximity sensor comprising:
    a) a magnetic member having a top surface, a bottom surface, and a side surface having a width between the top and the bottom surfaces of the magnetic member, said top surface being generally planar and wherein the magnetic member defines a cavity that extends into the magnetic member from the top surface;
    b) a sensing coil positioned within the cavity of the magnetic member;
    c) circuitry, coupled to the sensing coil, for energizing the sensing coil to define a sensing region in relation to the sensing coil and for sensing an object in the sensing region;
    d) a sensor housing supporting the circuitry and the magnetic member with the sensing coil; and
    e) a non-ferrous metal shield positioned inside the sensor housing and disposed around at least a portion of an outer perimeter of the magnetic member such that at least a portion of the side surface of the magnetic member is between the sensing coil and the non-ferrous metal shield,
    the non-ferrous metal shield having a top substantially aligned with the generally planar top surface of the magnetic member and having a width less than the width of the side surface of the magnetic member.

2. The proximity sensor of claim 1, wherein the magnetic member is generally cylindrical in shape and wherein the non-ferrous metal shield is a strip of non-ferrous metal.

3. The proximity sensor of claim 2, wherein the strip includes ends which are connected together forming an annular ring which surrounds the outer perimeter of the magnetic member.

4. The proximity sensor of claim 2, wherein the strip has a thickness of 0.002 to 0.005 inches.

5. The proximity sensor of claim 2, wherein the width of the strip is about one-half of the width of the side surface of the magnetic member.

6. The proximity sensor of claim 5, wherein the width of the strip is in a range of 0.25 to 0.30 inches.

7. The proximity sensor of claim 1, wherein said non-ferrous metal shield is spaced radially outwardly of the outer perimeter of the magnetic member by an insulator.

8. The proximity sensor of claim 7, wherein the insulator is adhesively secured to said strip and said outer perimeter of the magnetic member.

9. The proximity sensor of claim 7, wherein the insulator comprises cardboard having a thickness in a range of 0.03 to 0.05 inches.

10. The proximity sensor of claim 1, wherein said circuitry changes state of a switch in response to the sensing of an object in the sensing region, and
    wherein said circuitry includes a feedback control loop to minimize excessive changing state of the switch due to hysteresis effects when an object is located near an edge of the sensing region.

11. A proximity sensor defining a sensing region for detecting the presence of a target object entering the sensing region, the proximity sensor comprising:
    a) a housing having an end wall and side walls extending from said end wall defining a housing interior cavity;
    b) a magnetically permeable pot core having a generally planar upper surface, an annular groove that extends into a body of the pot core from said upper surface, a bottom surface, and a side surface having a width between the upper surface and the bottom surface of the pot core, the pot core disposed in said housing interior cavity such that the upper surface is adjacent the housing end wall and the sensing region extends outwardly in front of the upper surface of the pot core;

c) a non-ferrous metal strip disposed around at least a portion of an outer periphery of the pot core side surface such that at least a portion of the side surface of the pot core is between the annular groove and the non-ferrous metal strip, the strip having a top substantially aligned with the upper surface of the pot core and having a width less than the width of the pot core side surface; and d) sensor circuitry for detecting a target object in the sensing region, the sensor circuitry comprising:
 i) a sensing coil disposed in said annular groove of said pot core,
 ii) oscillation circuitry electrically coupled to said sensing coil for energizing the sensing coil to define the sensing region in relation to the sensing coil, the oscillation circuitry having an oscillator signal based on whether a target object enters the sensing region, and
 iii) a comparator coupled to said oscillation circuitry for comparing the oscillator signal to a reference signal, the comparator producing an output signal based on the comparison of the oscillator signal and the reference signal.

12. The proximity sensor of claim 11, wherein the oscillation circuitry includes circuitry for controlling hysteresis which occurs when a target object is near an edge of the sensing region.

13. The proximity sensor of claim 11, wherein the pot core is generally cylindrical in shape and wherein the strip includes ends which are connected forming a ring which encircles the side surface.

14. The proximity sensor of claim 11, wherein the strip is spaced outwardly from the pot core side surface by an insulator.

15. The proximity sensor of claim 14, wherein the insulator is a paper strip with an adhesive backing for attachment to the side surface.

16. The proximity sensor of claim 11, wherein the width of the strip extends from the upper surface of the pot core downwardly a distance at least about one third of the width of the pot core side surface.

17. A proximity sensor for sensing an object in a sensing region, the proximity sensor comprising:
 a) a pot core formed of a magnetically permeable material, the pot core having a generally planar top surface, a bottom, a side surface having a width between the top and the bottom surface of the pot core, and an outer perimeter bounding the side surface of the pot core, the pot core defining a groove which extends into the pot core from the top surface of the pot core;
 b) a sensing coil positioned in the groove of the pot core;
 c) oscillator circuitry coupled to the sensing coil for energizing the sensing coil to define the sensing region in relation to the sensing coil, the oscillator circuitry sensing an object in the sensing region based on an output signal of the sensing coil;
 d) a non-ferrous metal strip having a top substantially aligned with the generally planar top surface of the pot core and disposed around at least a portion of the outer perimeter of the pot core such that at least a portion of the side surface of the pot core is positioned between the sensing coil and the non-ferrous metal strip, the non-ferrous metal strip having a width less than the width of the side surface of the pot core; and
 e) an insulator positioned between the non-ferrous metal strip and the outer perimeter of the pot core.

18. The proximity sensor of claim 17, wherein the pot core is generally cylindrical in shape.

19. The proximity sensor of claim 18, wherein the non-ferrous metal strip has ends connected together to form a ring surrounding the outer perimeter of the pot core.

20. The proximity sensor of claim 17, wherein the non-ferrous metal strip includes copper.

21. The proximity sensor of claim 17, wherein the insulator is formed of cardboard.

22. The proximity sensor of claim 17, wherein the insulator is secured to the non-ferrous metal strip and to the outer perimeter of the pot core with an adhesive.

23. The proximity sensor of claim 17, wherein the oscillator circuitry includes circuitry for controlling hysteresis.

24. The proximity sensor of claim 17, wherein the oscillator circuitry includes a comparator for comparing the output signal with a reference signal, and
 wherein the oscillator circuitry senses an object in the sensing region based on the comparison of the output signal with the reference signal.

25. The proximity sensor of claim 17, in combination with a metal plate such that the proximity sensor is positioned in relation to the metal plate to sense an object passing over the metal plate.

* * * * *

UNITED STATES PATENT AND TRADEMARK OFFICE
CERTIFICATE OF CORRECTION

PATENT NO. : 5,801,530
DATED : September 1, 1998
INVENTOR(S) : Robert J. Crosby and Harold W. Everson, Jr.

It is certified that error appears in the above-identified patent and that said Letters Patent is hereby corrected as shown below:

Claim 17, line 5 (Column 10, line 1), "a bottom," should read --a bottom surface,--.
Claim 17, line 6 (Column 10, line 2), "top and" should read --top surface and--.

Signed and Sealed this

Fifteenth Day of December, 1998

Attest:

BRUCE LEHMAN

Attesting Officer     Commissioner of Patents and Trademarks